United States Patent
Kandlur et al.

(10) Patent No.: US 7,054,421 B2
(45) Date of Patent: May 30, 2006

(54) ENABLING LEGACY INTERACTIVE VOICE RESPONSE UNITS TO ACCEPT MULTIPLE FORMS OF INPUT

(75) Inventors: Dilip D. Kandlur, Yorktown Heights, NY (US); Dave B. Lindquist, Raleigh, NC (US); Baiju D. Mandalia, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 252 days.

(21) Appl. No.: 10/160,517

(22) Filed: May 31, 2002

(65) Prior Publication Data
US 2003/0223555 A1 Dec. 4, 2003

(51) Int. Cl.
*H04M 11/00* (2006.01)

(52) U.S. Cl. .............................. 379/93.15; 379/93.26; 379/88.01

(58) Field of Classification Search ............. 379/93.15, 379/93.25, 93.26, 88.01, 88.04, 88.05, 88.13, 379/88.14, 88.18; 704/270, 275, 277
See application file for complete search history.

(56) References Cited

U.S. PATENT DOCUMENTS

| | | | | |
|---|---|---|---|---|
| 4,827,500 A * | 5/1989 | Binkerd et al. | ........... | 379/88.01 |
| 5,659,665 A | 8/1997 | Whelpley, Jr. | .............. | 395/2.84 |
| 5,802,526 A * | 9/1998 | Fawcett et al. | ........... | 379/88.17 |
| 5,999,609 A | 12/1999 | Nishimura | .................... | 379/201 |
| 6,011,844 A | 1/2000 | Uppaluru et al. | ............ | 379/220 |
| 6,101,473 A | 8/2000 | Scott et al. | .................. | 704/275 |
| 6,104,803 A | 8/2000 | Weser et al. | ................. | 379/230 |
| 6,173,042 B1 | 1/2001 | Wu | .......................... | 379/88.04 |
| 6,208,966 B1 * | 3/2001 | Bulfer | ...................... | 379/88.01 |
| 6,240,391 B1 | 5/2001 | Ball et al. | .................... | 704/270 |
| 6,263,051 B1 | 7/2001 | Saylor et al. | ............ | 379/88.17 |
| 6,456,699 B1 * | 9/2002 | Burg et al. | .............. | 379/88.17 |
| 6,594,347 B1 * | 7/2003 | Calder et al. | ............ | 379/88.01 |
| 2003/0005076 A1 * | 1/2003 | Koch et al. | .................. | 370/352 |

OTHER PUBLICATIONS

D.L. Atkins, et al., *Integrated Web and Telephone Service Creation*, Bell Labs Technical Journal, vol. 2, No. 1, pp. 19-35, (Winter, 1997).

P. J. Danielsen, *The Promise of a Voice-Enabled Web*, Computer, vol. 33, No. 8, pp. 104-106, (Aug. 2000).

T. Ball, et al., *Speech-Enabled Services Using TelePortal/Sup TM/Software and VoiceXML*, Bell Labs Technical Journal, vol. 5, No. 3, pp. 98-111, (Jul.-Sep., 2000).

M. Wanderski, *Using the WebSphere Transcoding Publisher Programmatic Interfaces*, IBM Corporation, (Oct. 2001).

(Continued)

*Primary Examiner*—Stella Woo
(74) *Attorney, Agent, or Firm*—Akerman Senterfitt

(57) ABSTRACT

A method of enabling a legacy interactive voice response unit to accept multiple forms of user input can include associating dual tone multi-frequency selectable options of the legacy interactive voice response unit with non-dual tone multi-frequency user inputs. A non-dual tone multi-frequency user input can be received and processed to determine at least one dual tone multi-frequency selectable option that is associated with the received user input. Dual tone multi-frequency signals can be generated for selecting the at least one dual-tone multi-frequency selectable option associated with the user input. The dual tone multi-frequency signals can be provided to the legacy interactive voice response unit.

22 Claims, 2 Drawing Sheets

OTHER PUBLICATIONS

*WebSphere Transcoding Publisher*, IBM Corporation, <http://www-3.ibm.com/software/webservers/transcoding/>, (Sep. 24, 2002).

*WebSphere Voice Server*, IBM Corporation, <http://www-3.ibm.com/pvc/products/voice/voice_server.shtml>, (Sep. 24, 2002).

* cited by examiner ns and pointer input, user input generated from a visual browser, and a user spoken utterance. Non-DTMF user input can be received and processed to determine at least one DTMF selectable option that is associated with the received user input.

ENABLING LEGACY INTERACTIVE VOICE RESPONSE UNITS TO ACCEPT MULTIPLE FORMS OF INPUT

BACKGROUND OF THE INVENTION

1. Technical Field

The invention relates to the field of interactive voice response systems, and more particularly, to enabling interactive voice response systems to receive a variety of different forms of user input.

2. Description of the Related Art

Interactive voice response (IVR) units are used to automate call access to various application programs, database driven-applications, and information servers. For example, IVR units typically provide users with access to financial institutions, directory services, call center forwarding, and other selective information lookup services such as access to movie schedules and the like. IVR units can accept dual tone multi-frequency (DTMF) input, also referred to as touch tone input. Received DTMF input then can be translated to a data event which triggers a decision as to the proper response for the received user input. For example, the IVR unit can provide responses in the form of voice, facsimile, callback, electronic mail, as well as call processing information for directing a telephony switch as to how to handle a particular telephone call.

In an effort to provide callers with more flexibility in dealing with automated call access systems, many IVR providers are incorporating voice recognition functions within their IVR units. These state of the art IVR units can accept a combination of voice input and DTMF input, thereby providing users with several intuitive ways of interacting with an automated call access system.

Many legacy IVR units, which are still in service, lack the ability to process speech, and thus, are limited to processing only DTMF input signals. Presently, if an owner of a legacy IVR unit wishes to incorporate speech recognition functions to produce a more modern and intuitive application, the owner must purchase an upgraded IVR unit that is capable of performing speech recognition functions. Many computer system platforms upon which these legacy IVR systems operate, however, lack the required resources, or are incompatible with modern IVR units. In consequence, in addition to the expense of upgrading to a state of the art IVR unit, organizations may be faced with the added cost of upgrading an entire computer platform in support of a new IVR unit.

SUMMARY OF THE INVENTION

The invention disclosed herein provides a solution which enables a legacy interactive voice response (IVR) unit, one that lacks the ability to recognize speech, to receive a variety of different forms of user input. In particular, the present invention allows an IVR unit, for example one that is capable of receiving only dual tone multi-frequency (DTMF) signals, to receive speech input as well as other forms of data input. The present invention can intercept speech input and data input, and translate the input into DTMF signals that are understandable by the legacy IVR unit. Resulting DTMF translations of user speech and/or data input can be provided to the IVR unit for further processing. In consequence, organizations need not upgrade to new IVR systems and/or platforms in support of such systems.

One aspect of the present invention can include a method of enabling a legacy interactive voice response unit, for example one that is incapable of independently performing speech recognition, to accept multiple forms of user input. The method can include associating DTMF selectable options of the legacy interactive voice response unit with non-DTMF user inputs such as keystroke input, pointer input, user input generated from a visual browser, and a user spoken utterance. Non-DTMF user input can be received and processed to determine at least one DTMF selectable option that is associated with the received user input.

If the user input is a user spoken utterance, the processing step further can include speech recognizing the user spoken utterance to determine a textual representation of the user spoken utterance prior to determining the at least one DTMF selectable option. Notably, the format of the user input also can be determined. For example, the transport protocol and the markup language associated with the received user input can be determined.

DTMF signals for selecting the one or more DTMF selectable options associated with the user input can be generated. The DTMF signals can be provided to the legacy interactive voice response unit. A response can be received from the legacy interactive voice response unit which can be transcoded from a first modality to a second and different modality according to the identified format of the user input. If the response from the legacy interactive voice response unit is a call processing instruction, the call processing instruction can be routed to a node in a telecommunications network.

Another aspect of the present invention can include a system for enabling a legacy interactive voice response unit which is incapable of independently performing speech recognition to accept multiple forms of user input. The system can include at least one interface configured to receive user input, such as speech and data, which is directed to the legacy interactive voice response unit. A data store including possible non-DTMF user inputs and associated DTMF selectable options of the legacy interactive voice response unit also can be included. The system further can include a DTMF processor configured to determine DTMF selectable options from received user inputs according to the data store, and to generate DTMF signals understandable by the legacy interactive voice response unit for selecting the DTMF selectable option.

The system further can include a legacy interactive voice response unit which is incapable of independently performing speech recognition. For example, the legacy voice response unit may be capable of accepting only DTMF input. A transcoder can be included in the system. The transcoder can be configured to convert content from the legacy interactive voice response unit from one modality to at least a second and different modality. The transcoder also can transcode content from one markup language to another markup language. Additionally, the system can include a speech processing system configured to convert received user spoken utterances to text and to convert text to an audio stream.

BRIEF DESCRIPTION OF THE DRAWINGS

There are shown in the drawings embodiments which are presently preferred, it being understood, however, that the invention is not limited to the precise arrangements and instrumentalities shown.

DETAILED DESCRIPTION OF THE INVENTION

The invention disclosed herein provides a solution which enables a legacy interactive voice response (IVR) unit, one that lacks the ability to recognize speech, to receive a variety of different forms of user input. In particular, the present invention allows a legacy IVR unit, for example one that is capable of receiving only dual tone multi-frequency (DTMF) signals, to receive speech input as well as other forms of data input. Through the present invention, speech input and data input can be received and translated into DTMF signals that are understandable by legacy IVR units. Accordingly, the resulting DTMF translation of user speech and/or data input can be provided to the IVR unit for further processing.

Figure 1:
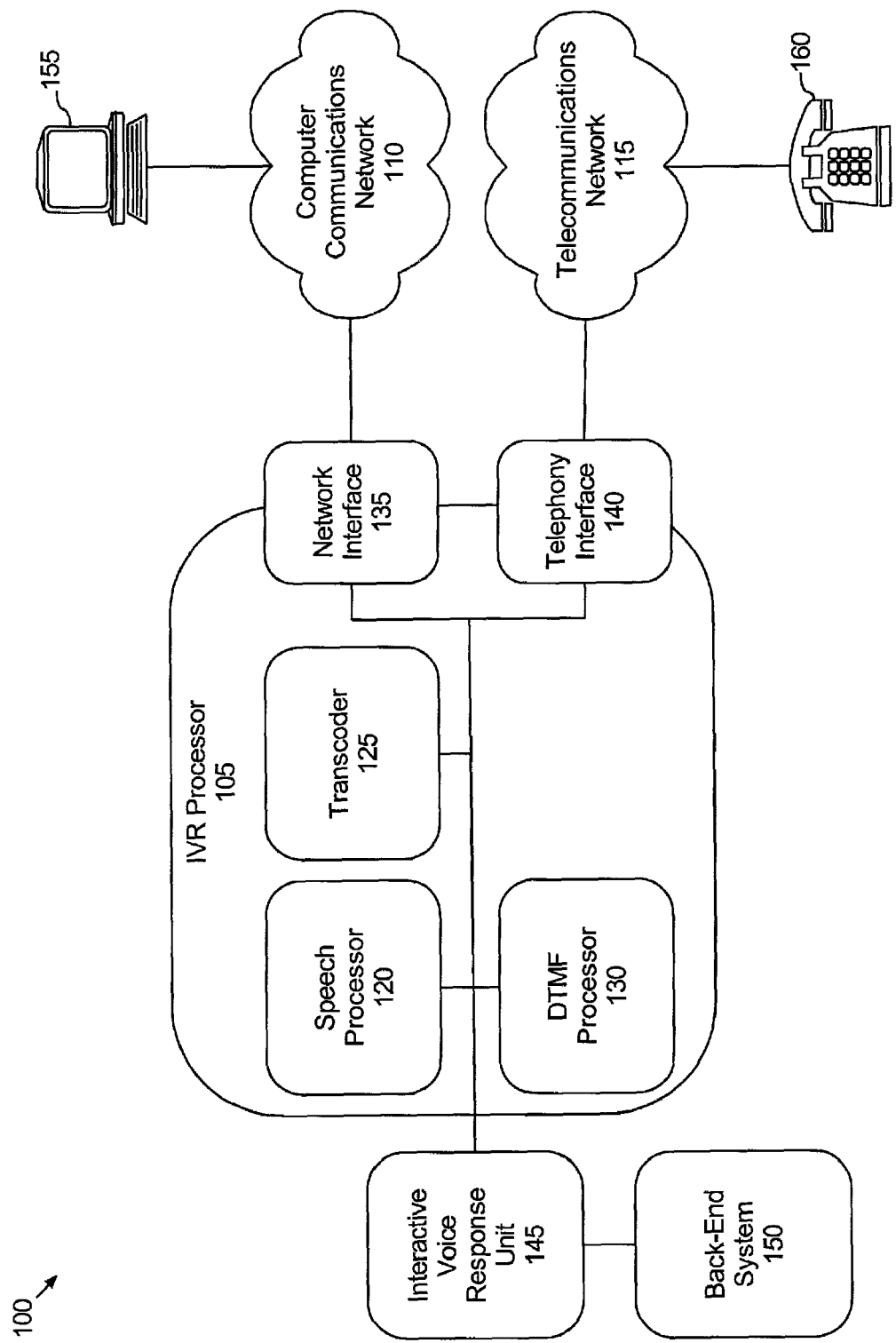
FIG. 1 is a schematic diagram illustrating a system which enables a legacy interactive voice response (IVR) unit to receive a variety of forms of user input in accordance with the inventive arrangements disclosed herein.

FIG. 1 is a schematic diagram illustrating a system which enables a legacy IVR unit to receive a variety of forms of user input in accordance with the inventive arrangements disclosed herein. As shown, the system 100 can include an IVR processor 105, an IVR unit 145, a back-end system 150, a computer communications network 110, a telecommunications network 115, and various network access devices such as a computer system 155 and a voice communications device 160.

The IVR unit 145 can be a legacy unit which can accept touch-tone keypad input, referred to as DTMF input, and provide appropriate responses in the form of voice, fax, callback, electronic mail, as well as other media. For example, in addition to providing voice responses, the IVR 145 can provide directory dialer functions including directory assistance, call transfer, and call forwarding. The IVR unit 145 can be communicatively linked to the back-end system 150. The back-end system 150 can include various applications, data, and logic for interacting with the IVR 145. The applications can specify call flow information including recorded speech prompts, text responses, and call processing instructions. This information can be specified in extensible markup language (XML) format so that content provided to the IVR 145 can be more easily transcoded if necessary.

The IVR processor 105 can include a speech processor 120, a transcoder 125, a DTMF processor 130, as well as a network interface 135 and a telephony interface 140. The IVR processor 105 can operate as a mediator between users and the IVR unit 145. Through its various interfaces, the IVR processor 105 can send and receive audio data such as user speech, recorded speech, and text-to-speech (TTS) generated audio. The IVR processor 105 also can send and receive data such as text and pointer manipulations, as well as receive any other data generated from a visual browser. For example, the IBM® WEBSPHERE® Voice Server 2.0 product which is available from International Business Machines Corporation of Armonk, N.Y., can provide the various functions of the IVR processor 105, with the noted exception of the transcoder 125 to be discussed herein. IBM® WEBSPHERE® Voice Server 2.0 can provide speech recognition, TTS, connectivity to the Web, Voice Extensible Markup Language (VXML) and Java support, as well as a telephony platform connector providing a run-time platform for speech applications capable of connecting voice/audio streams from the telephony network to speech recognition and TTS engines.

The IVR processor 105 can be incorporated as a component within an organizations's established interactive voice response system. Alternatively, the IVR processor 105 can be remotely located from the IVR unit 145 with which the IVR processor 105 is to interact. In that case, organizations can access the functions of the IVR processor 105 on a fee for service basis.

The speech processor 120 can provide both speech recognition functions as well as text-to-speech processing. As is well known in the art, the speech processor 120 can include a speech recognition engine which can convert digitized speech to text. The speech processor 120 can perform an acoustic analysis upon the digitized speech to identify one or more potential text or word candidates. The speech processor 120 further can perform a contextual or linguistic analysis upon the potential word candidates to determine a final text representation of the digitized speech signal. The speech processor 120 can include a text-to-speech processor which can produce a speech audio stream for playback of text input that is provided by an application. Additionally, if necessary, recorded audio also can be played via the speech processor 120.

The DTMF processor 130 can include program logic and a data store specifying relationships between text, whether speech recognized or keystroke derived, HTTP requests, pointer actions, and DTMF signals. In particular, associations between various text inputs and selections generated from a visual browser can be mapped to one or more DTMF signals which can be understood by the IVR 145. Accordingly, the DTMF processor 130 can generate DTMF signals as determined from the program logic and data store of user input and DTMF signal relationships.

The transcoder 125 can dynamically filter and reformat content from one format or markup language to another, thereby permitting content to be converted from one modality to another. For example, material to be represented visually can be reformatted for audible presentation. Thus, content specified in extensible markup language (XML) format can be translated into hypertext markup language (HTML), voice extensible markup language (VXML), or other formats such as wireless application protocol (WAP). An example of a transcoder is the IBM® WebSphere® Transcoding Publisher application available from International Business Machines Corporation of Armonk, N.Y.

The network interface 135 can communicatively link the IVR processor 105 with the computer communications network 110. Accordingly, through the network interface 135, the IVR processor 105 can send and receive content such as audio data including voice prompts and/or recordings, for example using voice over IP (VoIP). Through the network interface 135, a voice communications link can be established between the computer system 155 and the IVR processor 105 via the computer communications network 110. The computer communications network 110 can include, for example, a local area network, a wide area network, and/or the Internet. As previously mentioned, the voice link can be established using Voice over IP (VoIP), or any other suitable voice communications protocol.

Content such as text, pointer manipulations, and other forms of data, including markup language documents and data generated by visual browsers, can be received and sent through the network interface 135, for example using HTTP, instant messaging, or another suitable delivery protocol. The network interface 135 can facilitate the reception and transmission of data which may be sent to, or originate from, the computer system 155 through the computer communications network 110. For example, a user can interact with an Internet Website using the computer system 155 such that the various user interactions with the Website can be received through the network interface 135.

The telephony interface 140 can communicatively link the IVR processor 105 with the telecommunications network 115. Specifically, the telephony interface 140 can connect the speech recognition engine and the TTS processor of the speech processor 120 with the telephony network 140. Through the telephony interface 140, a voice link between voice communications device 160 and the IVR processor 105 can be established via the telecommunications network 115. The voice communications device 160 can be any of a variety of voice communications devices including, but not limited to, wired telephones, wireless telephones, voice-enabled personal digital assistants, and the like. The telecommunications network 115 can include, for example, one or more telephone switches or switching systems, private branch exchanges (PBX), service nodes, and the like.

Although the present invention can be implemented according to a variety of different computing architectures, according to one aspect, the present invention can be deployed using edge server technology. Edge server technology enables application processing and selected network content and components to be distributed or deployed to the edge of a network while still providing centralized administrative and application control. For example, IBM WebSphere® Edge Server V2.0 for Multiplatforms can be used to offload applications from application servers, deploy Web content to caches and "rehosting servers" throughout a network, and provide enhanced caching, load balancing, and security functions.

In operation, user spoken utterances can be received through either the computer communications network 105 or the telecommunications network 110. The speech processor 120 can speech recognize received user spoken utterances thereby converting the user spoken utterances to text. User input including HTTP requests, text, and pointer manipulations, from a visual browser for example, can be received as well. The received data, whether a recognized user spoken utterance, keyed input, an HTTP request, or pointer manipulations, can be correlated to one or more associated DTMF signals using the DTMF processor 130. The determined DTMF signals can be provided to the IVR unit 145, which then can trigger a data event within the IVR unit 145. Accordingly, the IVR unit 145 can interact with the back-end system 150 to access needed or requested information and to process the user request as specified by the DTMF signals.

After processing the received DTMF signals, the IVR unit 145 can provide a response to the IVR processor 105. If the response is an audio or voice response, the IVR processor 105 can serve as a conduit through which the audio can be provided to the user. Alternatively, the IVR unit 145 can instruct the IVR processor 105 to generate or play an audio response for the user. If the IVR unit 145 response is call processing information, for example where a caller is requesting to be transferred to a particular party, the IVR processor 105 can serve as a conduit through which the call processing instructions can pass to an intended node of either the telecommunications network 115 and/or the computer communication network 110. Notably, any content provided to the IVR processor 105 from the IVR unit 145 can be transcoded if necessary. For example, the IVR processor 105 can determine the format of incoming user requests and transcode the information being provided to the user to the same format and/or modality as the received request.

Figure 2:
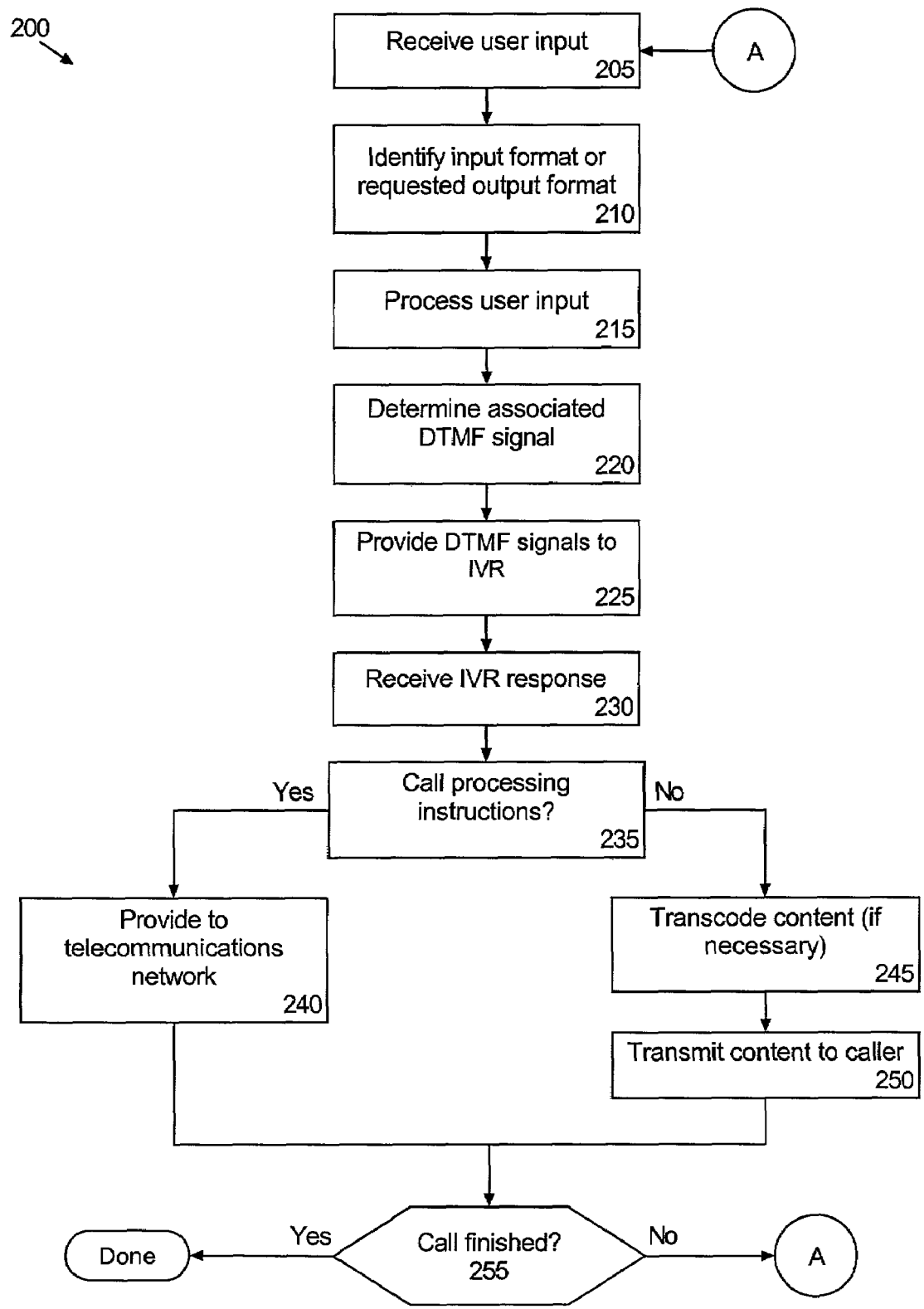
FIG. 2 is a flow chart illustrating a method of enabling a legacy IVR unit to accept various forms of user input.

FIG. 2 is a flow chart illustrating a method 200 of enabling a legacy IVR unit to receive a variety of user inputs. The method can begin in step 205 where a user input can be received by the IVR processor. As mentioned, the user input can be a user spoken utterance, pointer manipulations, text, as well as data generated by a visual browser. In step 210, the user input can be processed to determine the format of the output to be provided in response to the received input. For example, the input can be analyzed to determine the markup language and/or transport protocol of the received input so that the same formatting can be applied when responding to the received user input. Alternatively, the user input can explicitly specify the desired format of a response.

In step 215 the user input can be processed. For example, if the user input is speech, the speech can be recognized and converted to text for further processing. Received non-speech data can be parsed to determine relevant content. In step 220, the processed user data can be analyzed to determine the DTMF signals which corresponds to the received data. In step 225, the determined DTMF signals can be provided to the IVR.

Subsequently, a response can be received from the IVR in step 230. In step 235, a determination can be made as to whether the response specifies call processing instructions. If so, the method can proceed to step 240 where the call processing instructions can be forwarded to the telecommunications network. Thus, in cases where the IVR responds with instructions to transfer the caller to a particular directory number, for example, the instructions can be passed through the IVR processor and on to the intended telephone switching system which then can transfer the call in accordance with the IVR unit instructions.

If the response from the IVR does not specify call processing instructions, the method can proceed to step 245. In step 245, the content provided from the IVR can be transcoded according to the identified output format determined in step 210. If no transcoding is necessary, then the method can proceed to step 250. In step 250, the resulting content can be provided to the user. Notably, the IVR processor can function as a conduit through which particular responses such as audio responses from the IVR unit can be passed without transcoding. For example, the IVR can provide an audio response specifying a user requested directory listing. In that case the IVR can generate a TTS response which can be passed through the voice server and on to a user. The IVR unit also can instruct the voice server to generate or provide the audio response.

In step 255, if the call has finished, the method can end. For example, where the call has been successfully transferred or the call has been otherwise terminated, the method can end. If the call has not been terminated, for example where the caller requests additional information or further services, the method can continue to jump circle A and step 205 to receive further user input for processing.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method of enabling a legacy interactive voice response unit to accept multiple forms of user input, said method comprising:
    associating dual tone multi-frequency selectable options specific to said legacy interactive voice response unit communicatively linked to a telephone network with non-dual tone multi-frequency user inputs, said associating step utilizing code contained within an edge server that is communicatively linked to the telephone network;
    receiving a non-dual tone multi-frequency user input;
    processing said received user input utilizing the code to determine at least one dual tone multi-frequency selectable option associated with said received user input;
    generating dual tone multi-frequency signals for selecting said at least one dual tone multi-frequency selectable option associated with said user input; and
    providing said dual tone multi-frequency signals to said legacy interactive voice response unit via the telephone network in a user transparent fashion.

2. The method of claim 1, wherein said legacy interactive voice response unit is incapable of independently performing speech recognition, and wherein said received non-dual tone multi-frequency user input comprises a user spoken utterance, wherein said processing step further comprises speech recognizing said user spoken utterance to determine a textual representation of said user spoken utterance prior to determining said at least one dual tone multi-frequency selectable option.

3. The method of claim 1, wherein said non-dual tone multi-frequency user input is received by said edge server across a computer communications network, wherein said non-dual tone multi-frequency input is selected from the group consisting of keystroke input, pointer input, and user input generated from a visual browser.

4. The method of claim 1, further comprising:
    identifying a markup language associated with said non-dual tone multi-frequency user input, said code of said processing step being written in a different markup language; and
    transcoding said markup language associated with said non-dual tone multi-frequency user input to said different markup language during said processing step.

5. The method of claim 4, wherein the code of said processing step is when in an eXtensible Markup Language (XML).

6. The method of claim 4, wherein the non-dual tone multi-frequency user input comprises a user spoken utterance, and wherein the markup language associated with said non-dual tone multi-frequency user input is a markup language designed for voice based interaction.

7. The method of claim 4, wherein the non-dual tone multi-frequency user input comprises user input generated from a visual browser, and wherein the markup language associated with said non-dual tone multi-frequency user input is a HyperText Markup Language(HTML).

8. The method of claim 1, further comprising:
    receiving a response from said interactive voice response unit;
    interpreting said response utilizing code of the edge server written in a markup language;
    identifying a markup language associated with presenting the response to a response recipient;
    transcoding said interpreted response from the markup language of the edge server to the markup language associated with presenting the response to the response recipient.

9. The method of claim 1, further comprising:
    receiving a call processing instruction from said legacy interactive voice response unit; and
    routing said call processing instruction to a node in the telecommunications network.

10. A system for enabling a legacy voice response unit which is incapable of independently performing speech recognition to accept multiple forms of user input, said system comprising:
    at least one interface configured to receive user input directed to said legacy interactive voice response unit;
    a data store comprising a plurality of possible non-dual tone multi-frequency user inputs and associated dual tone multi-frequency selectable options specific to said legacy interactive voice response unit; and
    a dual tone multi-frequency processor configured to determine dual tone multi-frequency selectable options from received user inputs according to said data store and to generate dual tone multi-frequency signals in a user transparent fashion, wherein said dual tone multi-frequency signals are understandable by said legacy voice response unit for selecting said dual tone multi-frequency selectable options, and wherein said data store and said dual tone multi-frequency processor are disposed within an edge server of a telephony network.

11. The system of claim 10, further comprising:
    a legacy voice response unit which is incapable of independently performing speech recognition, wherein said at least one interface is configured to receive user spoken utterances, wherein selected ones of the dual tone multi-frequency user inputs comprise speech-to-text conversions of said user spoken utterances.

12. The system of claim 10, wherein said legacy voice response unit is capable of accepting only dual tone multi-frequency input, wherein user-input for which said at least one interface is configured comprise input other than dual tone multi-frequency input.

13. The system of claim 12, further comprising:
    a transcoder configured to convert content between one modality associated with said legacy voice response unit to at least a second and different modality associated with the at least one interface.

14. The system of claim 13, wherein one interface of the at least one interface includes a Web browser, and wherein the markup language associated with one interface is a Web based markup language.

15. The system of claim 10, wherein said transcoder is configured to transcode content from at least one markup language associated with one of the at least one interface to another markup language used by the dual tone multi-frequency processor.

16. The system of claim 15, wherein said interface is configured to receive speech input, said system further comprising:

a speech processing system configured to utilize code written in a markup, language designed for voice based interaction to convert received speech to text and to convert text to an audio stream, wherein the markup language of the code is the same as the at least one markup language associated with the at least one interface.

17. A machine-readable storage, having stored thereon a computer program having a plurality of code sections executable by a machine for causing the machine to perform the steps of:
   associating dual tone multi-frequency selectable options specific to said legacy interactive voice response unit communicatively linked to a telephone network with non-dual tone multi-frequency user inputs, said associating step utilizing code contained within an edge server that is communicatively linked to the telephone network;
   receiving a non-dual tone multi-frequency user input;
   processing said received user input utilizing the code to determine at least one dual tone multi-frequency selectable option associated with said received user input;
   generating dual tone multi-frequency signals for selecting said at least one dual tone multi-frequency selectable option associated with said user input; and
   providing said dual tone multi-frequency signals to said legacy interactive voice response unit via the telephone network in a user transparent fashion.

18. The machine-readable storage of claim 17, wherein said legacy interactive voice response unit is incapable of independently performing speech recognition, and wherein said received non-dual tone multi-frequency user input comprises a user spoken utterance, wherein said processing step further comprises speech recognizing said user spoken utterance to determine textual representation of said user spoken utterance prior to determining said at least one dual tone multi-frequency selectable option.

19. The machine-readable storage of claim 17, wherein said non-dual tone multi-frequency user input is received by said edge server across a computer communications network, wherein said non-dual tone multi-frequency input is selected from the group consisting of keystroke input, pointer input, and user input generated from a visual browser.

20. The machine-readable storage of claim 17, said identifying step further comprising:
   identifying a markup language associated with said non-dual tone multi-frequency user input, said code of said processing step being written in a different markup language; and
   transcoding said markup language associated with said non-dual tone multi-frequency user input to said different markup language during said processing step.

21. The machine-readable storage of claim 17, farther comprising:
   receiving a response from said interactive voice response unit;
   interpreting said response utilizing code of the edge server written in a markup language;
   identifying a markup language associated with presenting the response to a response recipient;
   transcoding said interpreted response from the markup language of the edge server to the markup language associated with presenting the response to the response recipient.

22. The machine-readable storage of claim 17, further comprising:
   receiving a call processing instruction from said legacy interactive voice response unit; and
   routing said call processing instruction to a node in the telecommunications network.

* * * * *